United States Patent [19]

Webster

[11] Patent Number: 5,221,991
[45] Date of Patent: Jun. 22, 1993

[54] DEVICE TO SECURE BINOCULARS TO A TRIPOD

[76] Inventor: James A. Webster, 7720 E. Lurlene Dr., Tucson, Ariz. 85730

[21] Appl. No.: 894,907

[22] Filed: Jun. 8, 1992

[51] Int. Cl.$^5$ .............................................. G02B 23/00
[52] U.S. Cl. ..................... 359/408; 359/407; 248/187; 248/105; 224/909
[58] Field of Search ............... 359/811, 812, 815, 816, 359/817, 818, 375, 407, 408, 409, 413; 248/187, 177, 105, 127, 314; 224/909

[56] References Cited

U.S. PATENT DOCUMENTS

| | | | |
|---|---|---|---|
| 2,450,927 | 10/1948 | Allen . | |
| 2,990,089 | 6/1961 | Nystrom | 359/409 |
| 3,281,106 | 10/1966 | Bogdanovich | 248/214 |
| 3,531,177 | 9/1970 | Akin | 359/413 |
| 4,557,451 | 12/1985 | Conway | 248/187 |
| 4,570,887 | 2/1986 | Banister | 248/187 |
| 4,899,189 | 2/1990 | Frost | 354/293 |
| 4,984,879 | 1/1991 | Plunkett | 359/408 |
| 5,078,155 | 1/1992 | Grandel | 248/105 |

Primary Examiner—Loha Ben
Attorney, Agent, or Firm—J. Michael McClanahan

[57] ABSTRACT

A device to secure binoculars to a tripod having a rectangularly shaped base plate of a durable material, a rectangularly shaped compressible resilient pad made of a high density closed cell foam material operably attached to the top side of the base, a holding plate situated centrally to the resilient pad and operably attached to the base, the holding plate securing the central point of an elongated flexible holding strap. The opposite ends of the strap emerging from under the holding plate provide a pair of loops to receive the monocular barrels of a pair of binoculars. The ends of the straps pass through individual openings at each end of the base not covered by the pad. At each end of the holding strap is a hook type cloth fastening material and a loop type cloth fastening material, each end of the strap passing through a respective oval opening to return on itself, the hook and loop fastening means engaging, thus securing the binoculars in place. Centrally located on the bottom side of the base is a blind threaded opening to receive a threaded bolt attached to the tripod.

20 Claims, 2 Drawing Sheets

DEVICE TO SECURE BINOCULARS TO A TRIPOD

BACKGROUND OF THE INVENTION

1. Field of the Invention

The field of the invention is devices which are adapted to secure a pair of binoculars to a tripod for use by hunters, bird watchers, and other parties wishing to aim a pair of binoculars at a distant stationary or semi-stationary target and secure them on that target.

2. Description of the Prior Art

In viewing a stationary or semi-stationary object at a distance utilizing binoculars, and especially high-powered binoculars, many times it is difficult to constantly hold the binoculars on the object. With just the slight movement of hands, the object in the field of view will very easily leave the viewing area, thus making it necessary for the user to again locate the object.

Accordingly, it has become common to mount the binoculars to a stationary tripod whereby the binoculars may be aimed upon the distant object and then the tripod locked so that the binoculars remain fixed on the object. Since some binoculars are not manufactured with a tripod mount attached to them, it is necessary to secure the binoculars to the tripod in one fashion or another. As a consequence, binocular rests have been devised that secure the pair of binoculars to itself by one or more methods and then the rest itself attaches to the tripod. While very fine binocular rests have been devised and are presently in the commercial market, yet those available have their shortcomings.

With respect to binoculars, two types are generally presently available. The first type, namely the roof-prism type, have a linear in-line view from the eye piece or ocular lens to the outside or objective lens for each monocular making up the binoculars. The second type of binocular is the porro-prism type, which interrupts each line of sight for each monocular from the ocular lens to the objective lens with two mirrors, each mirror making a direction change in the sight line by 90 degrees. Obviously, the porro-prism type of binoculars is usually larger in physical size than the roof-prism type. In addition, to adjust the eye width distance between the ocular lens of both types of binoculars, generally each monocular barrel of the binoculars connects to a swing arm, both arms joining at a centrally located pivot. Adjustment for eye width distance is obtained by pivoting one arm relative to the other, thus increasing or decreasing the distance between the two ocular lens.

One problem with prior art binocular rests is that while they secure the binoculars in one position and for a certain eye width distance between ocular lens, yet when a different user wants to use the binoculars and needs to adjust the pivoting swing arms to another eye width distance, either the binocular rest will not allow for such adjustment or, if it does, the secure hold that the rest had upon the binoculars is compromised, and thus requires a readjustment of the tightening mechanism of the binocular rest.

Now there exists binocular rests such as shown in the U.S. Patent to Conway U.S. Pat. No. 4,557,451, wherein two side-by-side elongated rounded troughs with a central hump are formed in a single element, both troughs then encompassed with a single strap. In the invention of Conway, binoculars are situated in the two troughs, the bottom portion of each monocular barrel in one of the two troughs, the single strap then passing over both of the tops of the monoculars to be secured on one side. The limitations of this device is that adjustment of the eye width distance between ocular lens of the binoculars, especially if the distance is lessened, results in a looser held fit than had been the case prior to the eye width distance adjustment.

Still other devices to secure similar or related devices such as a camera to a stationary standard is shown in the U.S. Patent to Frost, U.S. Pat. No. 4,899,189. Here a rather complicated mechanical device attaches to the camera and then, in turn, attaches to a tripod. In Frost's device, the means by which the camera is attached to the device is by a threaded bolt into a threaded blind hole provided in the camera. Binoculars, however, do not provide such accommodations.

Still another device which secures binoculars, but not necessarily to a tripod, is shown in the U.S. Patent to Bogdanovich, U.S. Pat. No. 3,281,106, which device provides a container type receptacle for the binoculars, the container then being attached to a bulkhead or the like. Obviously the invention is intended to be utilized on a ship or similar vessel. The container was so fashioned that the binoculars could be withdrawn only through the open mouth of the container and thereby rendering the binoculars immune to damage due to pitching and rolling of the seas.

It is thus obvious that it would be of great advantage to provide a device to secure binoculars to a tripod wherein in addition to being firmly secured to the tripod, the binoculars could also be operated upon such as manipulating the swing arm to adjust for different eye width distance without having to re-adjust the tightening mechanisms of the device securing the binoculars.

It is also obvious it would be of great advantage if such a device were easily removed from the tripod, and the device so compact as not to present an obstacle and thereby remain attached to the binoculars even while the user operates the binoculars away from the tripod.

Such device is presented in the following specification.

SUMMARY OF THE INVENTION

The embodiment of the invention described consists of a device to secure binoculars to a tripod, more particularly, a device consisting of a durable rectangularly shaped base plate with an attached rectangular shaped pad, the pad comprising a compressible, yet resilient, closed cell foam material such as neoprene, silicone rubber, polyethylene foam, or other compressible non-water absorbent material. The pad, attached to the top side of the base plate by an adhesive, is the same width as the base plate, but of shorter length. At each longitudinal end of the base plate, adjacent the ends of the attached resilient pad, is an oval opening, the function of which will be explained later. Located centrally to the pad is a rectangularly shaped holding plate which secures a single holding strap, the strap situated between the holding plate and the pad. The holding plate is secured to the base plate (with the pad in-between) by means of a pair of threaded fasteners, such as threaded machine bolts, the fasteners penetrating the holding plate, strap, and pad to engage threaded holes or openings in the base plate. The two ends of the strap rise up on opposite sides of the holding plate to form a pair of spaced apart loops, each distal end of the strap passing over one of the ends of the pad and into the aforementioned oval openings situated at opposite ends of base plate. On one side of each end of the strap is strategically placed VELCRO type fasteners, the hook type fastener at the very end of the strap, and then the loop-type fastener next to the hook type fastener.

In the preferred embodiment, the holding plate is screwed down and compressed into the foam pad, pushing the strap also into the foam pad, until the flat top surface of the holding plate is substantially planar with the flat surface of the resilient pad.

Lastly, situated centrally in the base plate on its bottom side is a blind threaded opening, the threaded opening adapted to receive a threaded bolt attached to the tripod, the combination securing the device to the tripod.

A pair of binoculars is employed with the device by placing one each of the barrel monoculars of the binoculars through one each of the two loops formed by the strap, the lower portion of each monocular resting upon the compressible resilient pad with the top portion of each monocular encompassed by its own separate loop of the strap.

By such construction, a pair of binoculars can be manipulated while held by the subject invention and the binoculars will remain firmly secure against movement, both prior to and after such manipulation. For example, if it is desired to adjust the eye width distance between ocular lens of the binoculars, such may be accomplished and yet, regardless of whether the width is widened or lessened, the binoculars still remain as secured as ever.

In addition, the device (with the binoculars attached) can be easily removed from the tripod and the binoculars carried by a strap around the user's neck. The attached device does not present a hinderance to the use of the binoculars away from the tripod.

Other embodiments of the invention provide construction wherein the resilient pad, and/or resilient pad and base, may be covered with a coating such as vinyl plastic or rubber. In addition, transverse troughs may be formed in the resilient pad to present a shaped compressible pad to further secure the barrels of each monocular. In addition, the pad may be obviated and the base utilized alone with a pair of transverse circular troughs formed in the base plate, the base plate then covered with a coating such as vinyl plastic or rubber.

Accordingly, it is an object of the present invention to provide a device which firmly secures a pair of binoculars for attachment to a tripod.

It is another object of the subject invention to provide a device which while securing binoculars to a tripod, allows for adjustment and manipulation of the binoculars, the device still firmly securing the binoculars against movement.

It is still another object of the subject invention to provide a device which secures a pair of binoculars to a tripod, but which is unobstructive and can remain with the binoculars when in use away from the tripod.

Other objects of the invention will in part be obvious and will in part appear hereinafter. The invention accordingly comprises the apparatus possessing the construction, combination of elements, and arrangement of parts which are exemplified in the following detailed disclosure and the scope of the application which will be indicated in the claims.

BRIEF DESCRIPTION OF THE DRAWINGS

For further understanding of the features and objects of the subject invention, reference should be had to the following detailed description taken in combination with the accompanying drawings wherein.

In various views, like index numbers refer to like elements.

DETAILED DESCRIPTION OF THE PREFERRED EMBODIMENT

Figure 1:
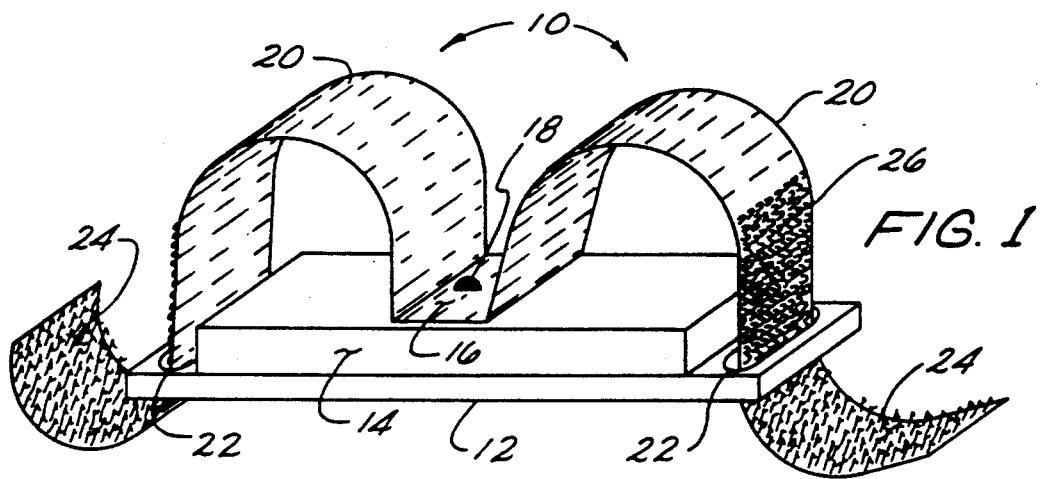
FIG. 1 is a perspective view of the invention.

Referring now to FIG. 1, a perspective view of the subject invention is shown. Firstly, the device which secures binoculars to a tripod comprises four major elements which, starting from the bottom of FIG. 1, include base plate 12 to which ultimately will be operably attached a pair of binoculars and which itself will be attached to a tripod (not shown). Base plate 12 in the preferred embodiment is a single piece of rectangularly shaped metal, 8 inches long, 1½ inches wide, and ¼ inch thick. At each end of base plate 12 are oval shaped openings, generally 1¼ inch long and ⅜ inch wide. The preferred metal used was a hard aluminum alloy able to accept threads. To base plate 12 is centrally attached a compressible, yet resilient high density closed cell foam pad 14, made of a material such as neoprene, silicone rubber, polyethylene foam, or other compressible non-water absorbent material, pad 14 attached to the top flat surface of base plate 12 by an appropriate adhesive. Pad 14, in the preferred embodiment, is also rectangular in shape, approximately 6½ inches long, 1¼ inches wide, and ⅜ inch thick. Pad 14 occupies all the top flat surface of base plate 12 except for a ¾ inch space at each end. Pad 14 is a compressible pad, although when squeezing it between one's fingers does require some force be exerted.

Central to pad 14 is rectangularly shaped holding plate 16, the top flat surface of which is shown in FIG. 1. Securing holding plate 16 to base plate 12 is threaded fastener 18, of which there are two (one shown), which penetrates holding plate 16 through an opening, continuing on through strap 20 and pad 14 and lastly is screwed into threaded openings in base plate 12. Holding plate 16 secures the binoculars flexible holding strap 20, strap 20 adapted to surround each of the monocular barrels of the binoculars in separate loops. Holding strap 20 is placed under holding plate 16 so that when holding plate 16 is secured to base plate 12, strap 20 is also secured. In the preferred embodiment, threaded fasteners 18 are screwed down to force holding plate 16 and strap 20 into pad 14 by compressing pad 14. Holding plate 16 is normally about 1¼ inch square, and ¼ inch thick. Holding plate 16 does not extend out to the edge of pad 14 so that the pad 14 will rise up on all sides of plate 16 as shown in FIG. 1. Preferably, the top flat surface of holding plate 16 is planar with the top flat surface of pad 14.

Flexible holding strap 20, which emerges from under holding plate 16 at opposite sides, may be constructed from nylon or other similar material. It makes a pair of loops, one for each monocular barrel of the binoculars, and then has each of the opposite ends diving through oval openings 22, one opening situated at each end of base plate 12. In the preferred embodiment, the width of flexible holding strap 20 was about the same as the length of oval opening 22, namely 1¼ inches.

Also seen on flexible holding strap 20 are the means by which each of the monocular barrels of the binoculars are secured to the invention, namely through a cloth fastening means such as VELCRO. Hook fastening means 24 is shown attached to the end portion of strap 20 joined by loop fastening means 26 continuing on up strap 20, both being on the same side. Both ends of strap 20 have the same combination of hook and loop fastening means as shown in FIG. 1.

In utilizing the invention, the binoculars are placed upon the device straddling holding plate 16 and strap 20 emerging from under plate 16 with each of the monocular barrels situated upon pad 14. Each end of flexible holding strap 20 is wrapped securely about each of the monocular barrels, each end of strap 20 then passing through an oval opening 22 at each end of base plate 12. The strap is then tightly pulled and folded back on itself so that the cloth fasteners are secured to each other. It is noted that with the type of arrangement shown in FIG. 1, binoculars of the type that pivotally adjust through swing arms to accommodate various eye spacing distance between ocular lens are kept with their respective monocular barrels in a secure manner against movement. Accommodation for the different widths is taken up by the compressible, yet resilient pad 14, there being sufficient room for side-to-side movement of the monocular.

Figure 2:
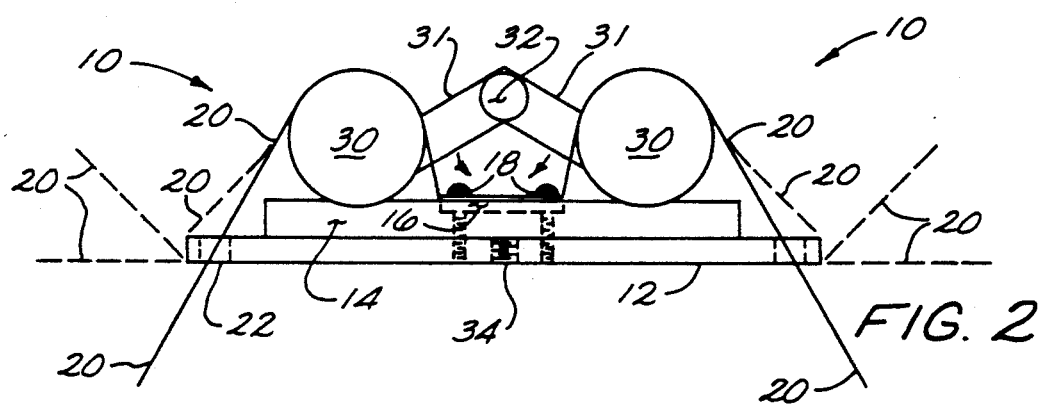
FIG. 2 is a front elevational view of the subject invention with a pair of binoculars in place.

Referring now to FIG. 2, a front elevational view is shown of the subject invention with a pair of binoculars 30 in place, the binoculars objective lens being shown together with the pivoting connecting swing arms 31. In FIG. 2, binoculars 30 are shown pushing down or compressing pad 14 as they are secured in place by pulling on flexible strap 20. Shown in FIG. 2 is flexible strap 20 in the process of being folded back upon itself after passing through oval opening 22 at each end of base plate 12. Since the fastening means are situated on the same side of the strap, they can engage each other. Also shown in FIG. 2 are the swing arms 31 attached to binoculars 30, arms 31 joined together at central pivoting point 32 whereby width adjustment to accommodate different widths between the users' eyes is accomplished.

As the width between each monocular barrels are adjusted, compressible resilient pad 14 and flexible strap 20 accommodates the different widths while strap 20 still maintains the binoculars in a tight holding configuration. There is no loosening of the binoculars nor will they drop out from the holding device 10 if the eye width spacing is lessened.

Lastly shown in FIG. 2 are the penetrations through pad 14 and strap 20 and into base plate 12 by threaded fasteners 18 which secure holding plate 16 and flexible strap 20 in place to base plate 12. Also shown in dotted form is threaded blind opening 34 which is adapted to receive a threaded bolt attached to a tripod (not shown) to secure device 10 to the tripod. It is noted that threaded fasteners 18 do not penetrate below the level of base plate 12 so that a bottom flat surface of base plate 12 with no protrusions (except for holding strap 20 at the ends) is presented.

Figure 3:
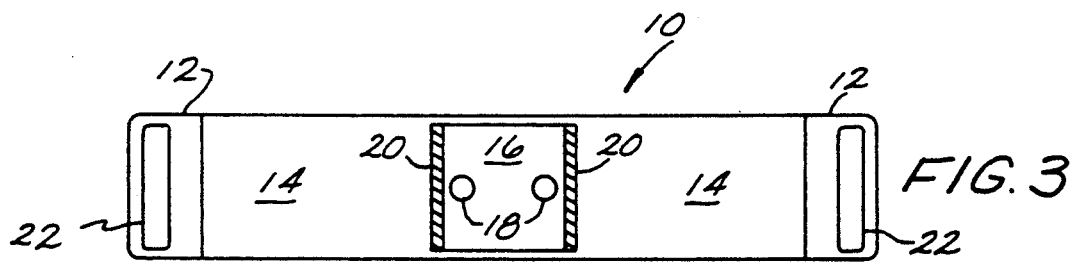
FIG. 3 is top view of the invention.

FIG. 3 is a top view of the subject invention wherein for simplicity and ease of understanding, strap 20 is shown in sectional view just emerging from under opposite sides of holding plate 16. As shown, holding plate 16 does not extend as far as the side edges of resilient pad 14. At opposite ends of device 10 is base plate 12 extending outward from underneath resilient pad 14. Oval openings 22 at each end of base plate 12 are also shown. For comfort in handling the device, the corners of base plate 12 have been rounded off as shown in the drawing.

Figure 4:
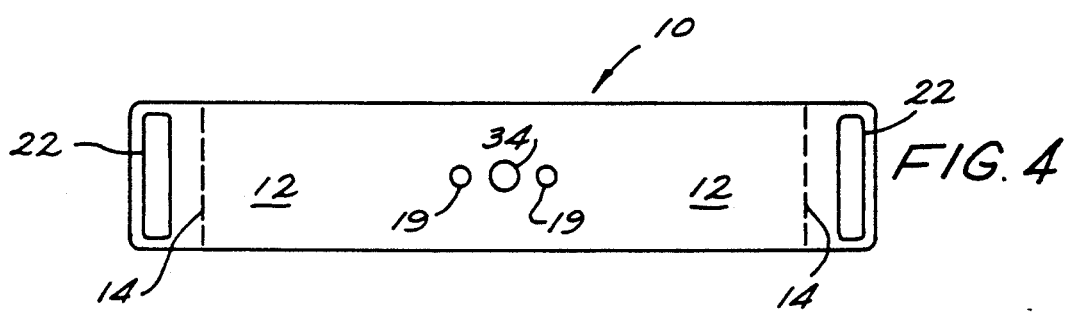
FIG. 4 is a bottom view of the invention.

Next, referring to FIG. 4, a bottom view of the subject invention is detailed showing firstly, base plate 12 with its centrally located blind threaded opening 34 to receive a threaded bolt from a tripod (not shown), and two threaded openings 19 adapted to receive the ends of threaded fasteners 18. Shown at opposite ends are the edges of pad 14 (dotted) and lastly, oval openings 22 adapted to receive the ends of flexible strap 20 (not shown).

Figure 5:
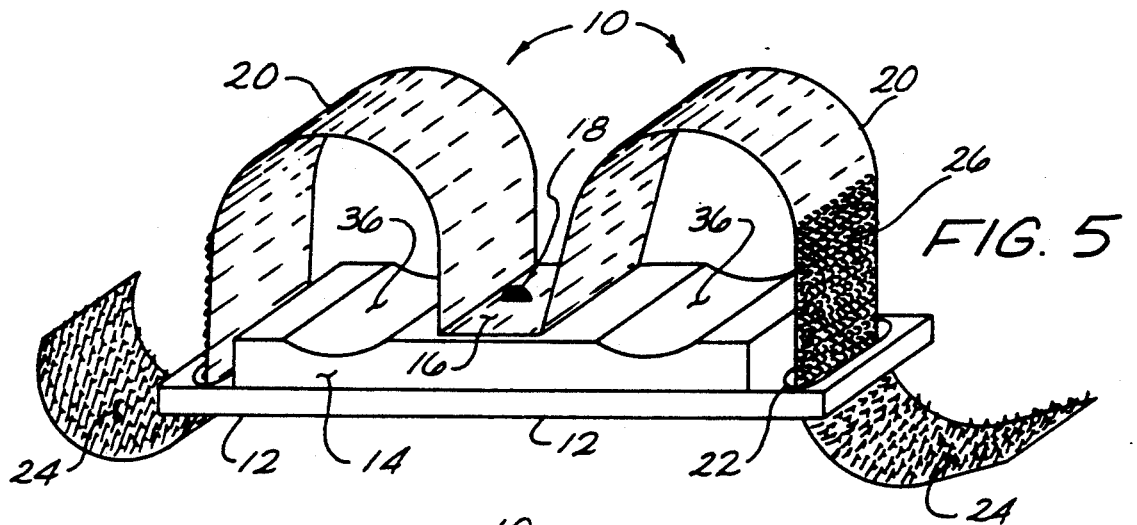
FIG. 5 is a perspective view of an alternate embodiment of the subject invention.

Continuing, FIGS. 5-9 show alternate embodiments of the invention which extend from the basic underlying concept. Firstly, FIG. 5 shows a perspective view of the subject invention with parallel elongated rounded troughs 36 formed or cut transversely in resilient pad 14. Each of these troughs receives one of the monocular barrels of the pair of binoculars (not shown) to provide a rest and a guide for the monocular barrels. By this means, the binoculars are even more securely anchored against side to side movement. All the remaining elements of the invention shown in FIG. 5 are identical to the same numbered elements of the invention shown in FIG. 1.

Figure 6:
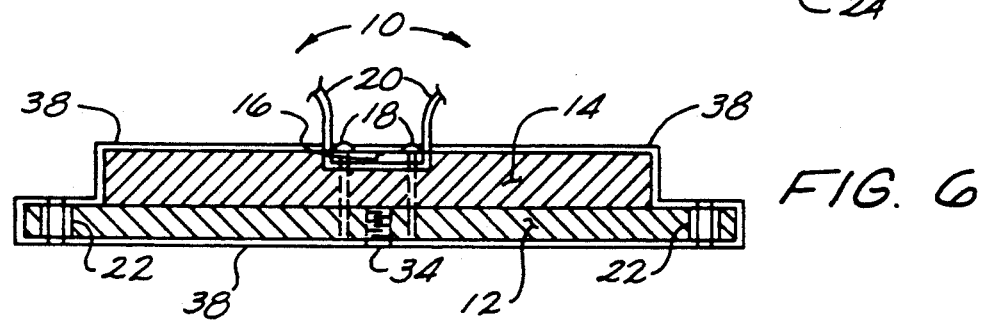
FIGS. 6, 7, 8, and 9 are cross-sectional views of the subject invention in various and different embodiments.

FIG. 6 shows a cross sectional view of still another embodiment of the invention where all parts of the invention, after being secured together, receive a vinyl plastic or rubber coating 38 on their outside surfaces. It is noted that the vinyl plastic coating even penetrates through the oppositely located oval openings 22 at each end of base plate 12, although a sufficient opening to receive strap 20 is left. Also noted is that holding plate 16 has also been vinyl plastic coated although the very tops of threaded fasteners 18 may protrude through. The only portion of the invention which was not vinyl coated was flexible strap 20, partially shown in FIG. 6 emerging from under holding plate 16 as it normally does. It is noted that when the invention is dipped in vinyl plastic to receive coating 38, threaded blind opening 34 must be preserved. Perhaps the best way to do this is to thread a bolt into threaded opening 34 prior to the dipping process and then remove the bolt after the vinyl plastic coating has set. The remaining elements in the invention as shown by the numerals are the same as defined in FIG. 1.

Figure 7:
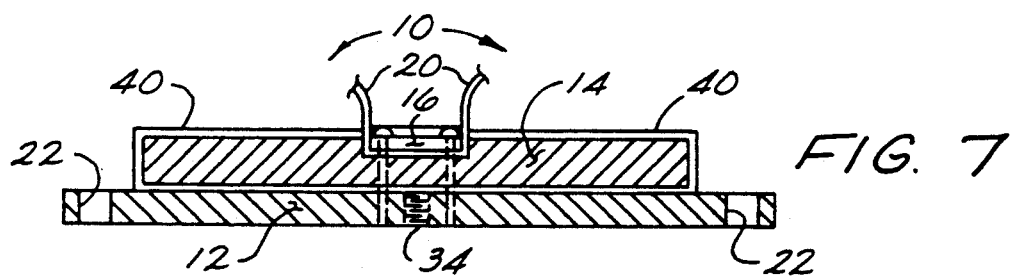

Referring now to FIG. 7, a slightly different embodiment of the invention from that shown in FIG. 6 is detailed in a cross-sectional view where here only compressible resilient pad 14 has been vinyl plastic or rubber coated, together with holding plate 16. Here, threaded fasteners 18 have been covered with the vinyl coating. Again, strap 20, which is shown in partial view, was not coated although the plastic or rubber coating reached to the strap where it emerges from under holding plate 16. Base plate 12 was not coated.

It is obvious that the vinyl coating which covers the resilient pad 14 shown in the embodiments of FIGS. 6 and 7 must also be flexible so that the purposes of the invention to depress the monocular barrels of the binoculars into the compressible resilient pad during the securing process to effect holding is accomplished. Vinyl plastic coating and rubberized coatings must be chosen which are flexible.

Figure 8:
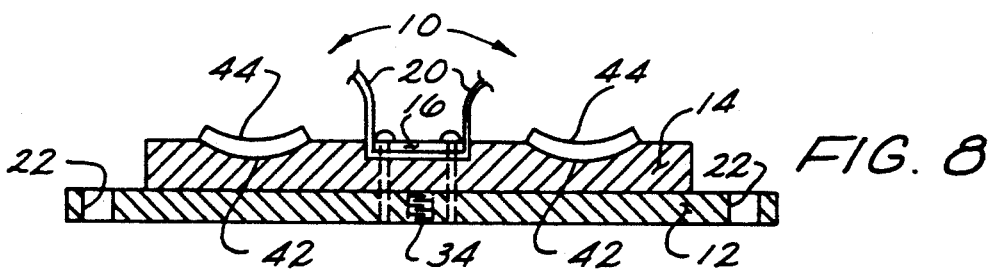

Referring now to FIG. 8, still another embodiment of the invention is shown in a cross-sectional view wherein parallel elongated rounded troughs 42 are formed transversely in pad 14 and then a second foam pad, perhaps much softer, such as an open cell foam made also of neoprene, are laid in each of the troughs and adhered to pad 14. By this combination of pads, an even softer rest is provided for each monocular barrel of the binoculars. The remaining elements shown in FIG. 8 and numerated by the same numerals as used in other drawings are the same elements as shown in the other drawings.

Figure 9:
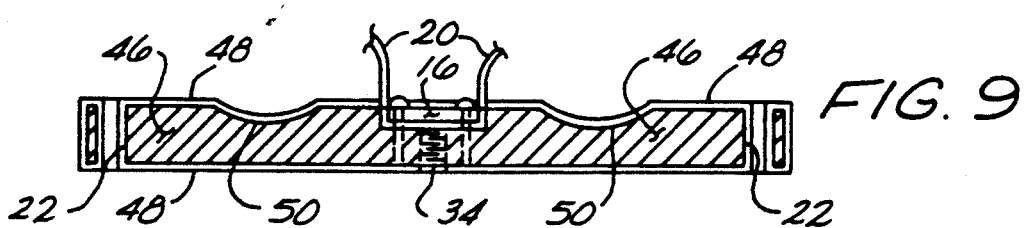

FIG. 9 shows a final alternate embodiment of the invention wherein a cross sectional view, only base plate 46 is employed. In the embodiment of FIG. 9, the compressible pad is not used. Into base plate 46 has been transversely cut a pair of parallel elongated circular troughs 50. Base plate 46 shown in FIG. 9 is preferably of the thickness greater than the base plate 12 shown in FIGS. 1-8, thereby accommodating the removed metal of the troughs. Next, the whole base plate together with holding plate 16 has been dipped in a mixture to coat the device resulting in coating 48, which may be vinyl plastic or rubber. The remainder portion of the device, namely strap 20 which is partially shown, is still held in place by holding plate 16. In the embodiment of FIG. 9, a portion of base plate 46 has been excavated to receive holding plate 16 although it is entirely possible that holding plate 16 may reside on top of base plate 46. The holes through base plate 46 accommodating threaded fasteners 18 would likewise be threaded. Also shown in FIG. 9 is threaded blind opening 34 adapted to receive the threaded bolt from a tripod (not shown) upon which the invention resides.

The invention has been constructed, together with the shown alternate embodiments, to secure a pair of binoculars in a tight secure configuration so that there is no movement of the binoculars relative to the invention, and of course, no movement of the invention relative to the tripod. The importance of this is that many times high powered binoculars are employed in the invention and the tripod adjusted to place them to view a stationary scene at long distance. It may be necessary for the user to affix the binoculars on the object and then look away from the binoculars for a time and then return to the binoculars. The binoculars remain pointed at the same scene. The invention also accommodates necessary adjustment of the binoculars for different eye widths without the binoculars becoming loose in the device.

The invention is also constructed such that it does not interfere with the focusing adjustments of the binoculars.

Because of the relative light weight of the subject invention, when it is desired to remove the binoculars from the tripod, it is not necessary to remove the binoculars from the subject inventive device, but in fact the invention may stay attached to the binoculars, even though the binoculars may be worn with a strap around an user's neck. In such a case, the subject invention would rest on the user's chest, still securely attached to the binoculars. The invention does not interfere with straps which may be placed on the binoculars by the manufacturer.

While a preferred embodiment of the invention has been shown and described, together with alternate embodiments thereof, it will be appreciated that there is no intent to limit the invention by such disclosure. Accordingly, the disclosure is intended to cover all modifications and alternate embodiments falling within the spirit and scope of the invention as defined in the appended claims.

I claim:

1. A device to secure binoculars to a tripod comprising:
   a base plate;
   a pad operably attached to said base plate;
   a flexible holding strap operably attached to said base plate, said holding strap being adapted to encompass the pair of binoculars; and
   means to secure said base plate to a tripod whereby said base plate is secured to said tripod while said flexible holding strap operably secures the binoculars to said base plate.

2. The device to secure binoculars to a tripod as defined in claim 1 wherein said base plate includes at least one opening therethrough, said opening being adapted to receive said flexible holding strap.

3. The device to secure binoculars to a tripod as defined in claim 2 further including a holding plate, said holding plate securing said flexible holding strap to said base plate, said holding plate being operably attached to said base plate.

4. The device to secure binoculars to a tripod as defined in claim 3 wherein said base plate comprises a rectangularly shaped plate having a length with two ends, width, and thickness defining a top and a bottom side, and said holding plate operably being attached to said base plate top side proximate the middle of said length.

5. The device to secure binoculars to a tripod as defined in claim 4 wherein said flexible holding strap has a length and two ends, said holding strap being operably secured by said holding plate midway between said two ends.

6. The device to secure binoculars to a tripod as defined in claim 5 wherein said base plate includes two openings therethrough, each of said openings being located proximate each of said ends.

7. The device to secure binoculars to a tripod as defined in claim 6 wherein each of said ends of said holding strap passes through each of said openings in said base plate, said flexible holding strap forming two loops, each of said loops encompassing a respective monocular barrel of the binoculars.

8. The device to secure binoculars to a tripod as defined in claim 7 further including fastening means operably attached to each of said ends of said flexible holding strap, said fastening means securing each of said loops of said flexible holding strap around each of the monocular barrels of the binoculars.

9. The device to secure binoculars to a tripod as defined in claim 8 wherein said fastening means operably attached to said flexible holding strap comprises a hook type cloth fastener and a loop type cloth fastener, said hook type fastener being adapted to engage said loop type fastener in a securing configuration.

10. The device to secure binoculars to a tripod as defined in claim 9 wherein said means to secure said base plate to a tripod defines a threaded opening formed in said bottom side of said base plate, said threaded opening being adapted to receive a threaded bolt of the tripod.

11. The device to secure binoculars to a tripod as defined in claim 10 wherein said pad receiving the monocular barrels of the binoculars defines a rectangularly shaped compressible resilient pad.

12. The device to secure binoculars to a tripod as defined in claim 11 wherein said compressible resilient pad defines a pad comprising a closed cell high density foam material.

13. The device to secure binoculars to a tripod as defined in claim 12 wherein said compressible resilient pad defines a pair of spaced apart parallel troughs, said troughs being adapted to receive the monocular barrels of the binoculars.

14. The device to secure binoculars to a tripod as defined in claim 13 further including a coating covering said base plate and said pad, said coating comprising a flexible material.

15. The device to secure binoculars to a tripod as defined in claim 12 further including a coating covering said compressible resilient pad, said coating comprising a flexible material.

16. The device to secure binoculars to a tripod as defined in claim 12 further including a second pad, said second pad comprising a low density foam material, said second pad being operably attached to said troughs in said compressible resilient pad.

17. A device to secure binoculars to a tripod comprising:
   a base plate;
   a holding plate operably attached to said base plate;
   a flexible holding strap operably attached to said base plate by said holding plate, said holding strap being adapted to encompass the pair of binoculars; and
   means to secure said base plate to a tripod whereby said base plate is secured to said tripod while said flexible holding strap operably secures the binoculars to said base plate.

18. The device to secure binoculars to a tripod as defined in claim 17 wherein said base plate defines a pair of spaced apart parallel troughs, said troughs being adapted to receive the monocular barrels of the binoculars.

19. The device to secure binoculars to a tripod as defined in claim 18 wherein said flexible holding strap has a length and two ends, said holding strap being operably secured by said holding plate midway between said two ends, and said base plate includes a pair of openings therein, each of said openings being adopted to receive each of said ends of said flexible holding strap, said flexible holding strap forming two loops, each of said loops encompassing a respective monocular barrel of the binoculars.

20. The device to secure binoculars to a tripod as defined in claim 19 further including fastening means operably attached to each of said ends of said flexible holding strap, said fastening means comprising a hook type cloth fastener and a loop type cloth fastener, said hook type fastener being adapted to engage said loop type fastener in a securing configuration whereby each loop formed by said flexible holding strap securely encompasses a respective monocular barrel of the binoculars.

* * * * *